JOHN RUDY.
Improvement in Thill-Couplings.
No. 128,252. Patented June 25, 1872.
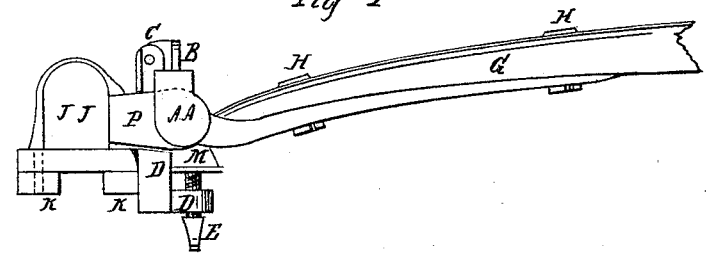
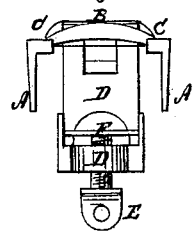 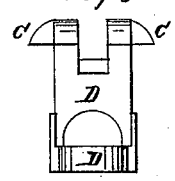 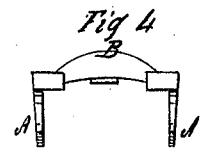
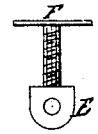 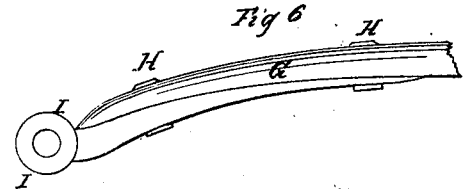 
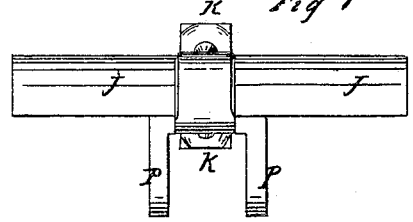
Witnesses.
Cornelius Custer
Saml Thomas
Inventor.
John Rudy 126,252

UNITED STATES PATENT OFFICE.

JOHN RUDY, OF NORRISTOWN, PENNSYLVANIA.

IMPROVEMENT IN THILL-COUPLINGS.

Specification forming part of Letters Patent No. 128,252, dated June 25, 1872.

SPECIFICATION.

Specification describing a new Carriage-Shaft Shifting-Box, invented by JOHN RUDY, of Norristown, in the county of Montgomery and State of Pennsylvania.

The first part of my invention relates to a carriage-shaft shifting-box in such a manner that will enable any person to fix it to any carriage, wagon, sleigh, or any other vehicle that has the use of a shaft, in one-fourth the time that it takes to put on the old carriage-shaft box. The second part of my invention relates to a clasp fixed with a hinge to the shifting-box, that when the coupling is placed in the shifting-box a bolt passes through the eyes of the shackle and coupling, and is thereby secured firmly in its place by the clasp without the use of either bur or head to the bolt. The third part of my invention relates to a screw and washer, which pass through the lower part of the shifting-box, and, by screwing it up, will come in contact with the gum that is placed in the shifting-box, and thereby keeping it in its proper place, and will protect the shaft from rattling, which, in the old carriage-box, invariably rattle. The screw and washer also keep the clasp in its place, so that there is not the least particle of danger of the bolt falling out.

Figure 1 is a side view embodying my invention. Fig. 2 is a front plan of my invention. Fig. 3 is a front plan of the shifting-box. Fig. 4 is a front plan of the clasp. Fig. 5 is a front plan of the screw and washer. Fig. 6 is a side view of the shaft and coupling. Fig. 7 is a side view of the axle and shackle. Fig. 8 is a side view of the gum.

D D is a shifting-box fitting into the ears of shackle P P, against the axle J J, which can be placed on any vehicle that has the use of a shaft. B is the clasp, working with a hinge on the upper part of the shifting-box D D, at the ears C C. A A are the eyes of the clasp, that when the bolt is put through the ears of the shackle P P and coupling I I they are then closed over, with the eyes A A at P P, thereby securing the bolt in its place, as represented in Fig. 1. E is the screw, which passes through the lower part of the shifting-box D D and is then countersunk in the square washer F. G is the carriage-shaft, which is fastened with two bolts, H H, to the coupling I I. J J is the axle of the carriage, to which the whole of the shifting-box is attached, too, by two screws, K K. M is the gum fitting in the shifting-box D D, and, by screwing the screw E in the countersunk washer F, presses it against the gum M, which fits against the coupling I I, and thereby keeps the clasp B firmly in its place, and also keeps the coupling I I from rattling in the box D D.

I make no claim to the shaft G or coupling I I; neither do I claim the axle J J, nor eyes or shackles P P, nor the gum M, for I am aware that these are not new; but I do claim as my invention and desire to secure by Letters Patent—

The combination of the shifting-box D D and C C and the clasp B and A A, also the screw E and the washer F, substantially as and for the purpose hereinbefore set forth.

JOHN RUDY.

Witnesses:
CORNELIUS CUSTER,
SAML. THOMAS.